United States Patent [19]
Venturello

[11] 3,929,827
[45] Dec. 30, 1975

[54] 1N, 1N'-PHENYLENBIS(5-METHYL-4-PYRAZOLIN-3-ONES) AND PROCESS FOR PREPARING SAME

[75] Inventor: Carlo Venturello, Turin, Italy
[73] Assignee: Montecatini Edison S.p.A., Milan, Italy
[22] Filed: Sept. 25, 1973
[21] Appl. No.: 400,516

[30] Foreign Application Priority Data
Sept. 26, 1972 Italy.................................. 29674/72

[52] U.S. Cl.............................................. 260/310 A
[51] Int. Cl.² ........................................ C07D 231/08
[58] Field of Search................................ 260/310 A

[56] References Cited
UNITED STATES PATENTS
2,013,181 9/1935 Kracker et al.................. 260/310 A
2,936,306 5/1960 Schmid et al................... 260/310 A OTHER PUBLICATIONS
Recueil des travaux chimiques des pays–bas, tome 58, pp. 58–62 (1939).

Primary Examiner—Donald B. Moyer

[57] ABSTRACT

There is disclosed a new class of pyrazolones having the formula

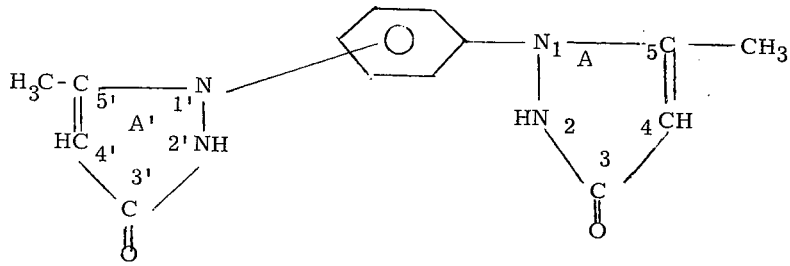

in which the pyrazolone ring A' is in either meta or para position with respect to the pyrazolone ring A. A process for preparing the new products is also disclosed.

3 Claims, No Drawings

1N,1N'-PHENYLENBIS(5-METHYL-4-PYRAZOLIN-3-ONES) AND PROCESS FOR PREPARING SAME

The pyrazolones of this invention, which are new compounds that have not been described in the literature heretofore, are useful, in general, in the field of organic synthesis and, in particular, in the preparation of pigments and the synthesis of dyestuffs.

Surprisingly, I have found that this new class of compounds can be prepared starting from the corresponding tetra-azotized phenylendiamines obtained in the solid state, by simple reaction with the diacetyl dimer in the aldolic form. The reaction sequence may be represented as follows:

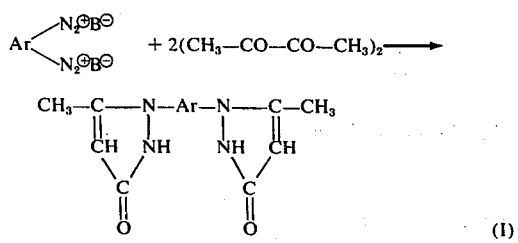

(I)

wherein $B^{\ominus}$ is $HSO_4^{\ominus}$.

The reaction between the phenylendiamine tetrazonium salt and the diacetyl dimer occurs only when the former is in the solid state. The choice of the $HSO_4^{\ominus}$ annion is due to the fact that the tetra-azotization is carried out in $H_2SO_4$ and that the tetrazonium salt having $HSO_4^{\ominus}$ as an anion is easily obtainable in the solid state.

Solvents which dissolve the tetrazonium salt have a detrimental effect on the course of reaction (I), as can the environment in which the tetra-azotation itself takes place.

The reaction is carried out under atmospheric pressure and at temperatures ranging from 30° to 50°C.

The diacetyl dimer is prepared in the aldolic form according to the method of O. Diels, W. M. Blanchardt, H. Heyden [Berichte, 47, 2359].

The dimer is used in excess with respect to tetrazonium sulfate. In general, a molar ratio of 6–7 : 1 is employed.

Tetra-azotation of aromatic diamines is obtained by the action of nitrosyl-sulfuric acid on the diamines. In order for the reaction to occur satisfactorily, it is advisable to add the aromatic diamine very slowly and under vigorous stirring to the sulfuric solution containing the stoichiometric quantity of nitrosylsulfuric acid while maintaining temperature constant at around 20° – 25°C. The reaction ends upon total dissolution of the diamine.

By slowly pouring the thus obtained sulfuric solution into acetone cooled to −15°C, the tetrazonium sulfate of the diamine used is obtained by precipitation of the solution. By operating in this manner, it is possible to obtain the tetrazonium sulfate of aromatic amines with good yields. The products according to the invention can be easily purified by sublimation.

The following examples are given to better illustrate the invention, and are not intended to be limiting.

EXAMPLE 1

24 g of concentrated $H_2SO_4$ are fed into a 100 cc Erlenmeyer flask provided with a magnetic stirrer and cooled with ice. 2.76 g of $NaNO_2$ are added very slowly, in such a manner that no yellow fumes are produced. The mixture is then heated slowly under stirring to a temperature of 70°C so as to have an almost complete solution. The whole is allowed to cool to room temperature. 15.5 g of 78% $H_2SO_4$ are added. The $Na_2SO_4$ formed starting from the sulfuric solution of nitrosylsulfuric acid is filtered, 1.9 g of p-phenylendiamine are added very slowly under stirring, keeping the temperature between 20° – 25°C. The sulfuric solution obtained at the end of the reaction is poured slowly into acetone cooled to −15°C. The tetrazonium sulfate precipitates and is purified with cold acetone and filtered. 5.5 g of product are obtained.

2.7 g of tetrazonium sulfate are mixed with 10 g of the diacetyl dimer in the aldolic form in a small 50 cc flask provided with a mechanical stirrer and a cooler. The mixture is heated under stirring to 35° – 40°C for six hours. At the end of the run, the whole is washed with ether until the diacetyl dimer disappears. The solid residue is boiled with acetone. 3.4 g of crude, doubly-salified product having the formula:

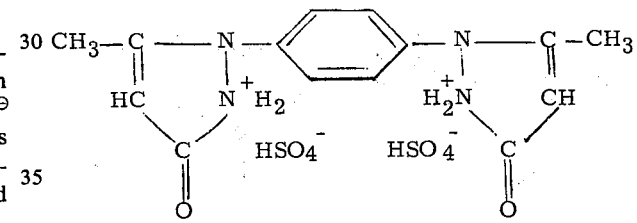

are obtained.

The analysis of the crude product gives the following values (for $C_{14}H_{18}N_4O_{10}S_2$):

|            | C     | H    | N     | S     |
| ---------- | ----- | ---- | ----- | ----- |
| calculated | 36.05 | 3.86 | 12.01 | 13.73 |
| found      | 37.65 | 4.05 | 11.84 | 12.37 |

The salt, suspended in $H_2O$, loses $H_2SO_4$ and gives the final product. 1.9 g of crude product are obtained. The product is purified by sublimation.

The elementary analysis of the sublimated product gives the following values (for $C_{14}H_{14}N_4O_2$):

|            | C     | H    | N     |
| ---------- | ----- | ---- | ----- |
| calculated | 62.61 | 5.22 | 20.73 |
| found      | 61.95 | 5.17 | 20.29 |

The product does not show a melting point at 320°C. The I.R. spectrum is in accordance with the pyrazolone structure. The M.W. (determined by mass spectography) is 270.

EXAMPLE 2

5.4 g of m-phenylendiamine tetrazonium sulfate prepared as in Example 1 are mixed with 20 g of the diacetyl dimer in the aldolic form in a small 50 cc flask provided with a mechanical stirrer and a cooler. The mixture is heated under stirring to 35° – 40°C for six hours. At the end of the reaction, ether is added to remove the diacetyl. The residue is dispersed in water and the reaction product precipitates. The filtered solid is dried and purified with acetone. 2.9 g of crude product are obtained.

For further purification, the product is dissolved in 10% NaOH, heated under reflux for 3 hours, and reprecipitated with 10% HCl. The product may be sublimated. The analysis of the sublimated product gives the following values (for $C_{14}H_{14}N_4O_2$):

|  | C | H | N |
|---|---|---|---|
| calculated | 62.21 | 5.22 | 20.73 |
| found | 62.47 | 5.49 | 20.28 |

The sublimated product does not show a melting point at 320°C. The I. R. spectrum is in accordance with the pyrazolone structure. The M. W. (determined by mass spectrography) is 270.

What we claim is:
1. A process for preparing 1N, 1N'-para- or meta-phenylenbis (5-methyl-4-pyrazolin-3-ones) having the formula

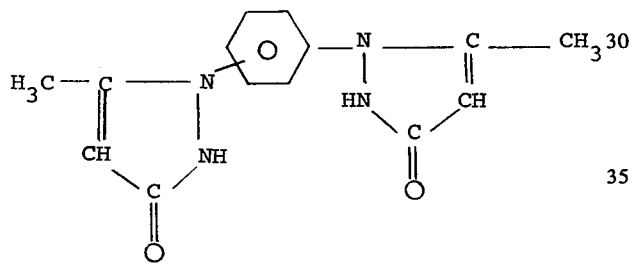

which comprises reacting solid para- or, respectively, meta-phenylendiamine tetrazonium sulphate with diacetyl dimer in aldolic form, in a molar ratio of from 6:1 to 7:1, for about six hours, under atmospheric pressure and at a temperature of 30°C to 50°C, washing the reaction product comprising the salt of the 1N, 1N'-para- or meta-phenylenbis (5-methyl-4-pyrazolin-3-one) thus obtained with ether to remove unreacted diacetyl dimer, and dispersing the salt in water to liberate $H_2SO_4$ and recover the 1N, 1N'-para- or meta-phenylenbis (5-methyl-4-pyrazolin-3-one).

2. The compound

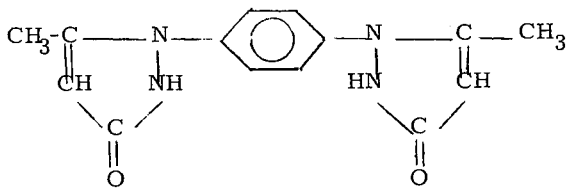

3. The compound

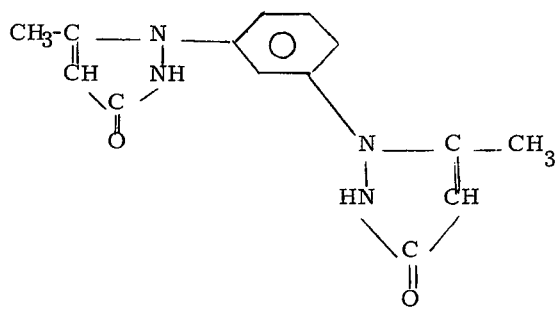

* * * * *